United States Patent
Hall et al.

(10) Patent No.: US 9,345,190 B2
(45) Date of Patent: May 24, 2016

(54) METHOD OF MANUFACTURING A COMMODITY TANK FOR AIR SEEDER

(71) Applicant: CNH Canada, Ltd., Saskatoon, Saskatchewan (CA)

(72) Inventors: Kevin Hall, Saskatoon (CA); Darwin Zacharias, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 61 days.

(21) Appl. No.: 14/160,872

(22) Filed: Jan. 22, 2014

(65) Prior Publication Data

US 2014/0123465 A1 May 8, 2014

Related U.S. Application Data

(62) Division of application No. 13/167,378, filed on Jun. 23, 2011, now Pat. No. 8,672,173.

(51) Int. Cl.
*A01C 15/00* (2006.01)
*B23P 11/00* (2006.01)

(52) U.S. Cl.
CPC ............ *A01C 15/006* (2013.01); *A01C 15/005* (2013.01); *B23P 11/00* (2013.01); *Y10T 29/49826* (2015.01); *Y10T 29/49879* (2015.01)

(58) Field of Classification Search
CPC .... A01C 15/006; A01C 15/005; B23P 11/00; Y10T 29/49879; Y10T 29/49826
See application file for complete search history.

(56) References Cited

U.S. PATENT DOCUMENTS

| | | | |
|---|---|---|---|
| 3,799,383 | A | 3/1974 | Gerhard |
| 3,912,103 | A | 10/1975 | Gerhard |
| 4,460,214 | A | 7/1984 | Kuhns |
| 4,549,672 | A | 10/1985 | Rinkewich |
| 5,189,965 | A | 3/1993 | Hobbs et al. |
| 5,190,157 | A | 3/1993 | Przytulla |
| 5,232,246 | A | 8/1993 | Page |
| 5,582,311 | A | 12/1996 | Bartenstein et al. |
| 5,947,040 | A | 9/1999 | Gregor |
| 6,269,967 | B1 | 8/2001 | de Vries |
| 6,854,405 | B2 | 2/2005 | Memory |
| 6,982,105 | B2 | 1/2006 | Huse |
| 7,585,000 | B1 | 9/2009 | Hoek |
| 2002/0166861 | A1 | 11/2002 | Hinkle et al. |
| 2011/0006068 | A1 | 1/2011 | Kaupp |

FOREIGN PATENT DOCUMENTS

DE 003511108 10/1986

*Primary Examiner* — John C Hong

(74) *Attorney, Agent, or Firm* — Rebecca L. Henkel

(57) ABSTRACT

A commodity tank for use with an air seeding implement includes a series of panels arranged to form an enclosure defining a volume configured to hold a supply of commodity. At least one or more of the panels has a warping-reducing bend formed therein. The commodity tank further has a series of tubular members with each tubular member located between adjacent and perpendicular panels to define a respective corner of the enclosure.

2 Claims, 9 Drawing Sheets

METHOD OF MANUFACTURING A COMMODITY TANK FOR AIR SEEDER

CROSS-REFERENCE TO RELATED APPLICATION

This application is a divisional of application Ser. No. 13/167,378 filed Jun. 23, 2011.

BACKGROUND OF THE INVENTION

The present invention relates generally to farm implements and, more particularly, to a commodity tank for an air seeder.

An air seeder is an agricultural implement that is commonly used to plant usually a seed crop in a large field. Air seeders typically have centrally located hoppers for seed and fertilizer which distributes them through an air stream to individual seed rows. It is convenient to fill, easy to clean out and move. Any crop that can be grown from seeds—which might vary is size from oilseeds to corn, can be sewn by an air seeder.

The seed and fertilizer hoppers are usually carried on a large cart located behind or in front of the seeder. The air stream is created by a high capacity fan mounted on the cart which blows air through conduits (pipes) connecting the hoppers and the row units. Seed and fertilizer are metered out from the hoppers by a meter wheel that is turning in a ratio set by the operator for the proper seed rate or seed density. The seeds enter the pipe in the airstream and follow the pipes which terminate in the seedbed. Openers pulled through the soil make the opening where the seeds are placed. They are typically made of steel in the shape of points, discs or cultivator shovels. Once placed in the seed bed, the air is blown out the opening in the soil and the seed and fertilizer remain. The seeder can then pack the soil tight to retain moisture near the seed and harrow the furrows so the field is not rough.

A typical air seeder has an agricultural commodity cart ("air cart") comprising at least one, and commonly two, three or more tanks for carrying various agricultural products like seed and fertilizer, which are bolted or otherwise attached to the frame of the commodity cart. The tanks are typically made from either polyethylene, such as found on a CaseIH Precision Air 3380, or steel such as found on the CaseIH Precision Air 3580.

There is a continued demand for larger capacity commodity tanks. Larger tanks are particularly desirable for wider seeding implements, such as the CaseIH Precision Air 3580. Wider seeding implements are capable of depositing more seed in a single pass. Wider seeding implements will consume seed more rapidly than smaller implements. Hence, there is a general desire to outfit wider seeding implements with larger capacity commodity tanks.

Larger capacity commodity tanks are typically assembled from planar sheet panels. The corners of the tanks are typically formed by separate corner pieces that are attached to a pair of sheet panels. Alternately, it is also common for the ends of adjacent panels to be bent to form an overlapping joint. Regardless of how the corners are made, as the commodity tanks are made larger, the sheet metal panels that collectively form the tanks are consequently larger, One of the drawbacks of larger sheet metal panels is the increased tendency for such panels to warp due to manufacturing processes such as welding or media blasting. One approach to reduce this warping has involved the intentional formation of a bend along the width of the sheet metal panel. Unfortunately, these bends make the connections to mating panels more difficult because basic shapes such as a single overlapping bend or a single bend corner cap cannot be used.

SUMMARY OF THE INVENTION

The present invention provides a method and apparatus for effectively fabricating larger commodity tanks that are formed from a series of sheet metal panels having a warp-reducing bend. To make the interface between panels with warp-reducing bends and planar mating panels at the corners of the commodity tank more effective, the present invention provides a commodity tank having square tubes at the corners.

The square tubes provide a large flat surface for the bent sheet panel to mate to as well as an expansive perpendicular surface to which the adjacent mating panel can be attached. Placing the tubes in the corners of the commodity tank also allows the square tubes to be used as structural members for interfacing with the frame of the air seeder. Additionally, the square tubes may be made hollow and used as ducting to introduce pressure from the air system of the air seeder into the commodity tank.

Therefore, in accordance with one aspect of the invention, a commodity tank for use with an air seeding implement includes a series of panels arranged to form an enclosure defining a volume configured to hold a supply of commodity. At least one or more of the panels has a warping-reducing bend formed therein. The commodity tank further has a series of tubular members with each tubular member located between adjacent and perpendicular panels to define a respective corner of the enclosure. In one embodiment, the tubular members are elongated square tubes.

In accordance with another aspect of the invention, a commodity tank for use with an air seeder includes a series of generally rectangular shaped panels of sheet metal interconnected by an equal number of corner members otherwise separate from the panels. The corner members are each comprised of an elongated square structural member.

The invention may also be embodied in a method. Accordingly, the present invention provides a method of manufacturing a tank for use with an air seeder. The tank includes a plurality of generally planar panels forming sides of the tank. The method includes attaching adjacent planar panels to an elongated corner piece having a generally square-shaped cross-section. The panels and the elongated corn eves collectively define an enclosure for holding a granular commodity.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the Drawings.

DETAILED DESCRIPTION

Figure 1:
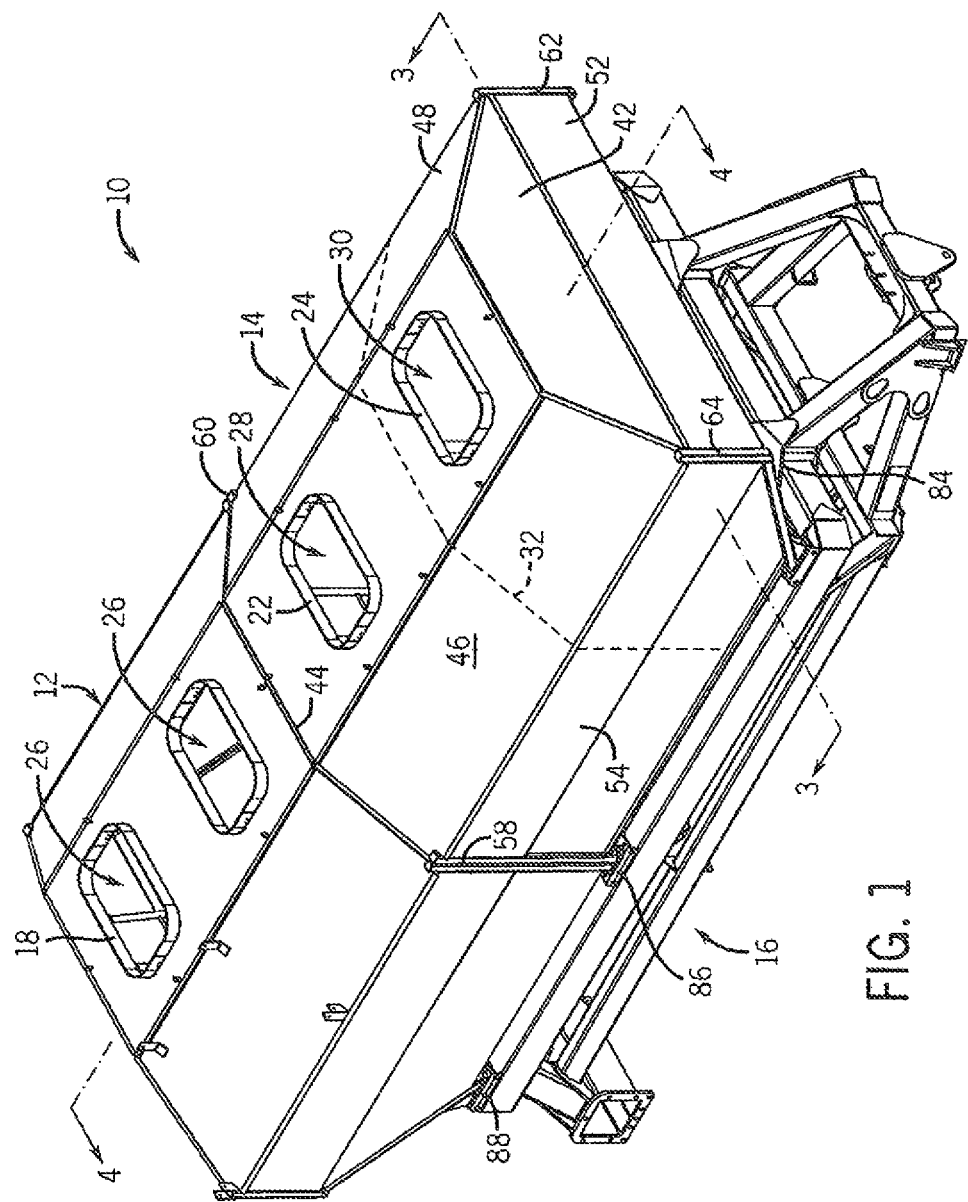
FIG. 1 is an isometric view of an air cart having a commodity tank according to one embodiment of the invention.
Figure 2:
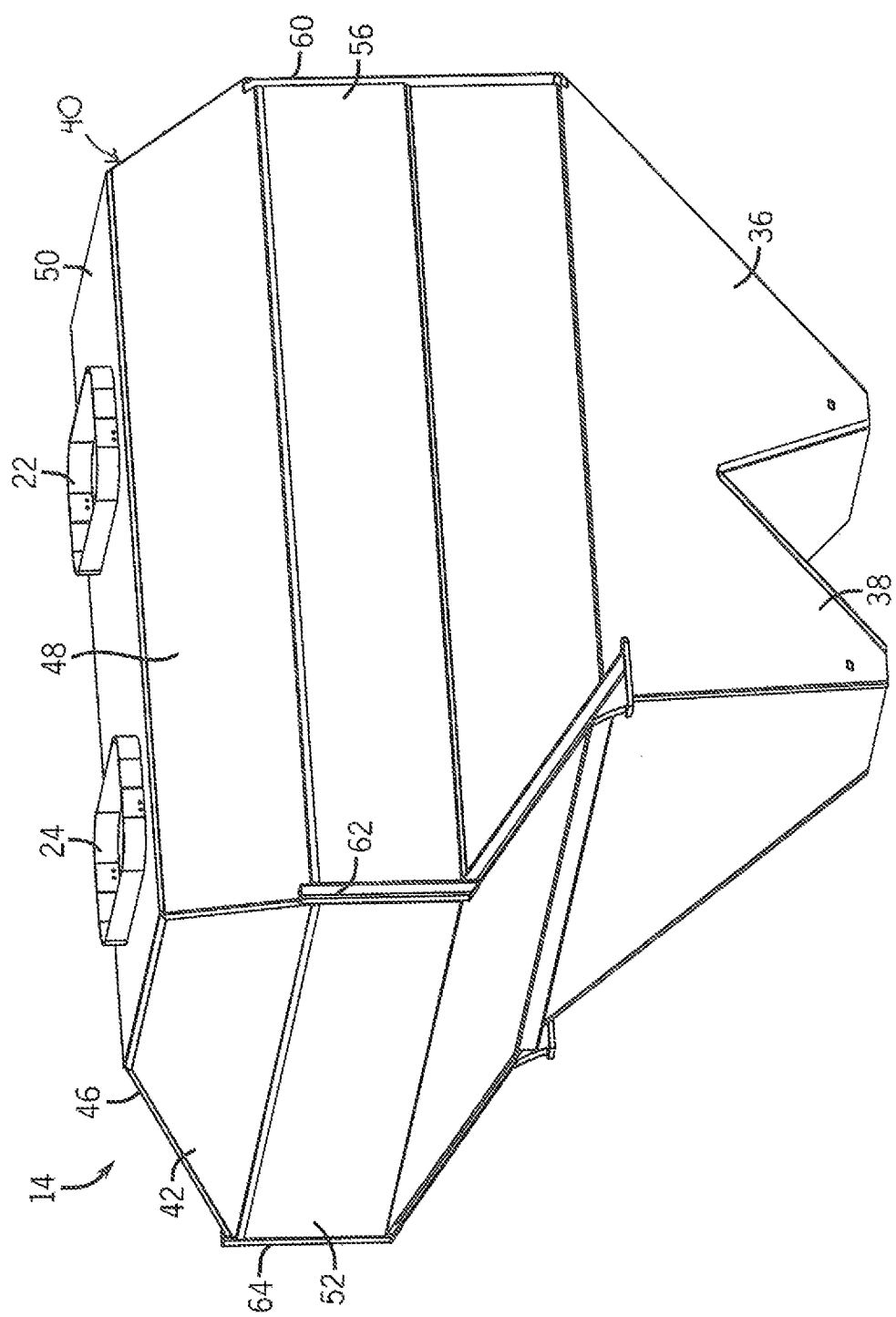
FIG. 2 is a top isometric view of a commodity tank according to one embodiment of the invention.
Figure 3:
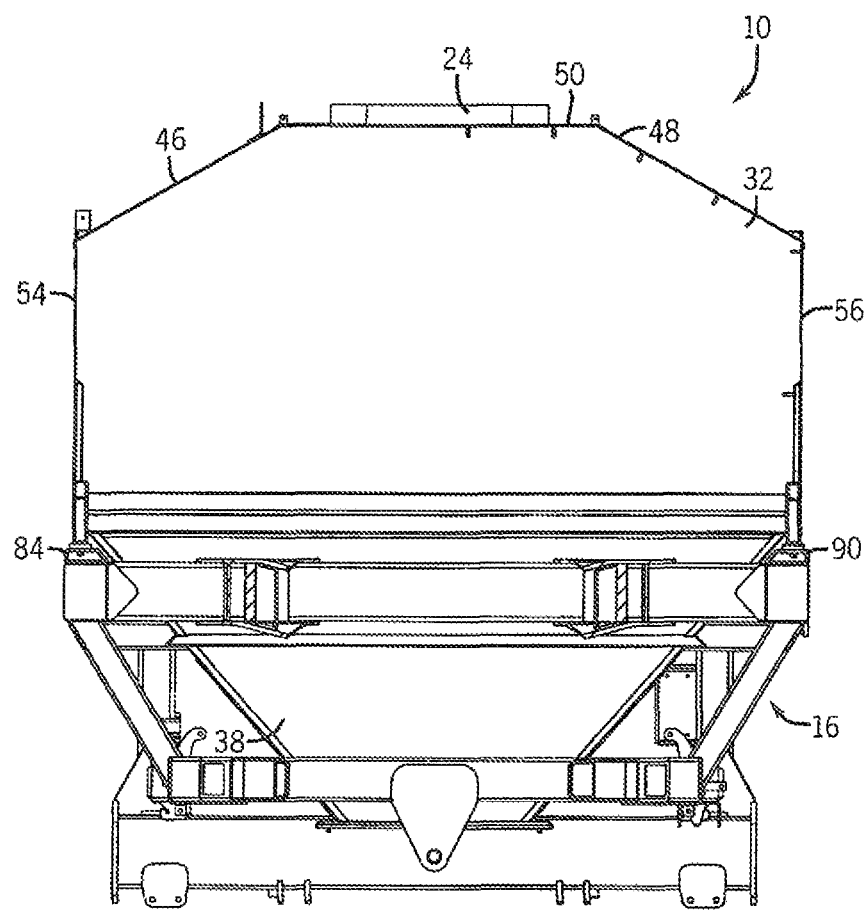
FIG. 3 is a section view of the commodity tank taken along line 3-3 of FIG. 1.
Figure 4:
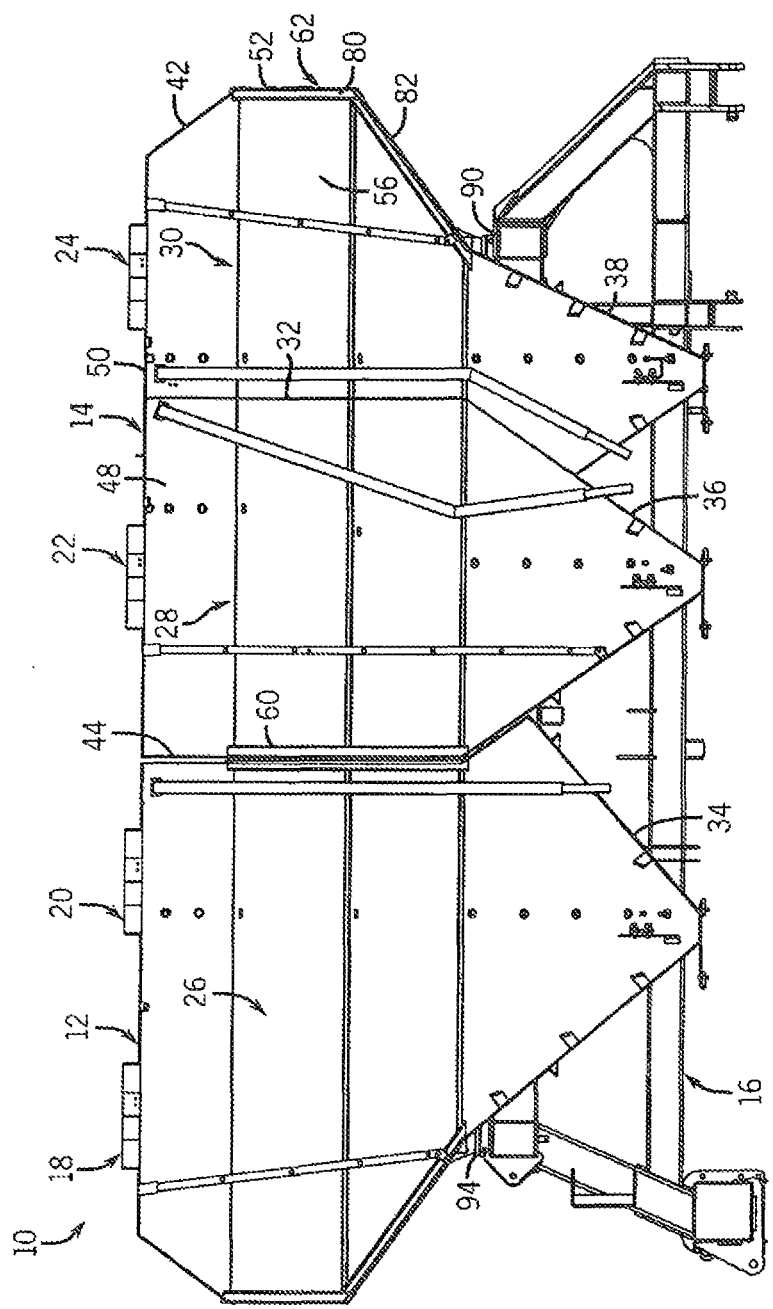
FIG. 4 is a section view of the commodity tank taken along line 4-4 of FIG. 1.

Turning now to FIGS. 1-4, an air cart 10 having a pair of commodity tanks 12, 14 mounted to a frame 16 is shown. The frame 16 is of generally conventional design and thus will not be described further herein. Additionally, it is understood that the commodity tank 12 could be mounted to different types of frames. The illustrated commodity tanks 12, 14 have two hatches 18, 20 and 22, 24, respectively. Hatches 18, 20 open into a shared compartment 26 and hatches 22, 24 open into separate compartments 28, 30, respectively. As best shown in FIGS. 3 and 4, compartments 28, 30 are separated from one another by a divider plate 32, which is also shown in phantom in FIG. 1. It is contemplated that the divider plate 32 may be a fixed mounting within tank 14 or may also be removably mounted. As also shown in FIG. 4, each compartment has respective lower portions 34, 36, 38 that are flow coupled in a known manner to a commodity delivery system (not shown).

It is understood that the invention is not limited to a commodity tank having two separate compartments. Moreover, while the air cart 10 is shown having a pair of commodity tanks, it is understood that the invention is not so limited. Thus, in one embodiment of the invention, an air cart may be equipped with a single tank or could have more than two such tanks "stacked" on a frame to tailor an air cart for a specific sized implement or satisfy a particular consumer request.

For purposes of further describing the invention, commodity tank 14 will be described more fully below but it is understood that commodity tank 12 is similarly constructed. Moreover, as shown in FIG. 1, multiple tanks can be mounted on a shared frame 16 to form an air cart 10 capable of holding larger volumes of grain, seed, granular chemicals, and the like.

Turning now to FIG. 2, commodity tank 14 generally consists of an upper portion 40 and the aforementioned lower portions 36, 38. In most simple terms, the upper portion 40 defines the upper region of compartments 28, 30 to each have generally rectangular volumes whereas the lower portions 36, 38 are shaped so that the lower region of the compartments 28, 30 each have generally frustoconical volumes.

The upper portion 40 is defined by a series of panels connected to one another using conventional assembling processes, such as welding. More particularly, the panels include upper end panels 42, 44 (shown in FIG. 4) and upper side panels 46, 48, The upper end and upper side panels are connected to top panel 50 in which the hatches 22, 24 are formed.

The panels further include end wall 52 and sidewalls 54, 56. End panel 42 is positioned opposite end wall 52, as shown in FIG. 4, and effectively functions as another end wall for commodity tank 14. The sidewalls 54, 56 connect to the end panel 42 and end wall 52 via corner members 58, 60, 62, 64. The interconnection with the corner members will be described more fully below. in a preferred embodiment, the panels are formed from sheet metal.

As shown in FIGS. 5, 6, 7, and 9, the sidewalls 54, 56 are bent to reduce warping. Sidewall 56 will be described but it is understood that sidewall 54 is similarly designed. Sidewall 56 generally consists of a panel of sheet metal that is bent in a conventional manner to form an inwardly extending bent portion 66 generally defined at the midpoint in the height of the panel. In this regard, the bent portion 66 segments the panel into an upper panel portion 68 and a lower panel portion 70. In a preferred embodiment, the bent portion 66 extends along the entire width of the sidewall 56. The sidewall 56 has upper edge 72 that abuts against upper side panel 48 and a lower edge 74 that fits over a top edge of a corresponding panel (not numbered) of the lower portion 38. it is understood that the top and bottom edges of the sidewall 56 could be weld to the upper side panel 48 and the lower portion 38, respectively.

Figure 5:
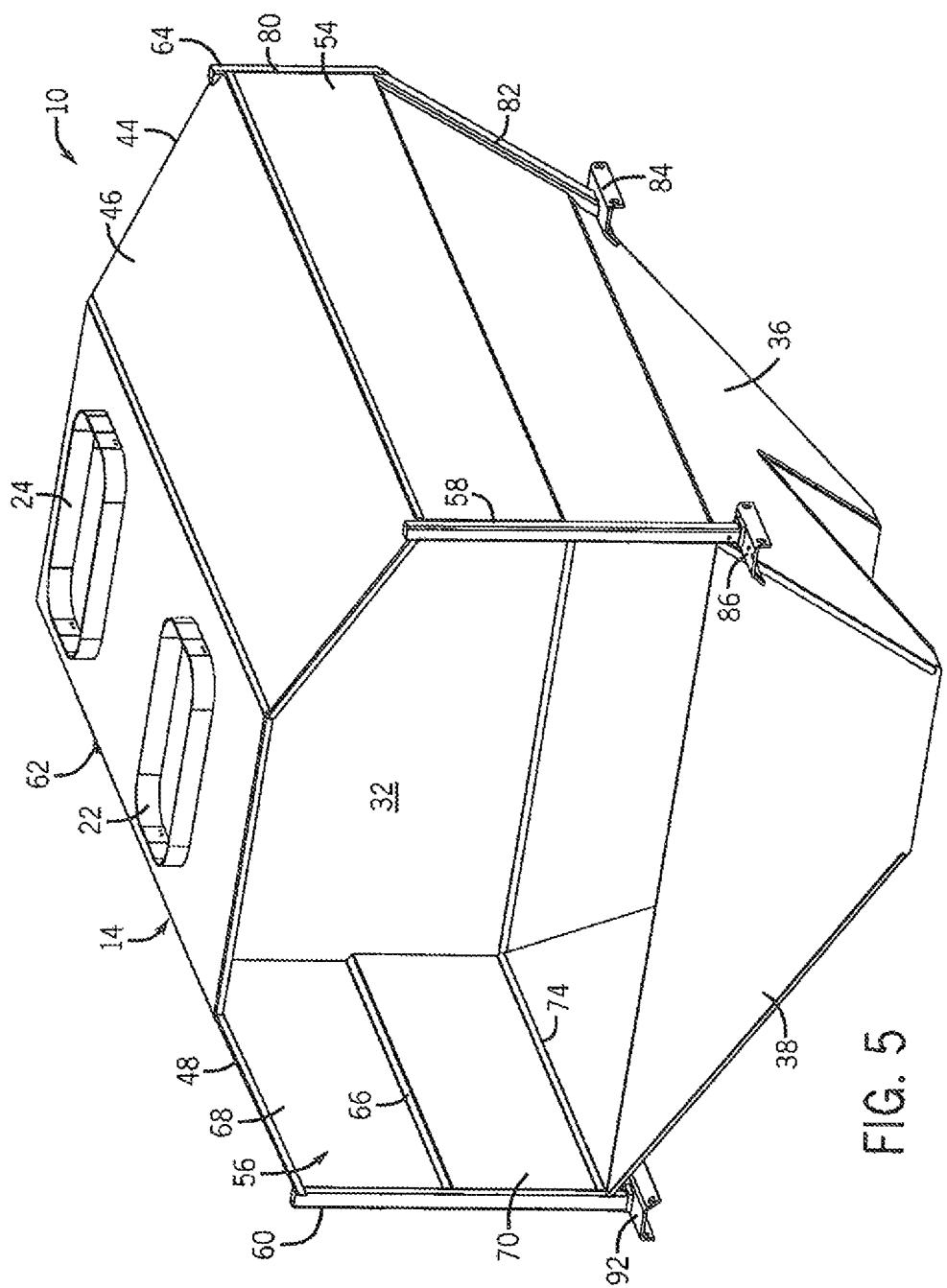
FIG. 5 is a partial cutaway end view of the commodity tank.
Figure 6:
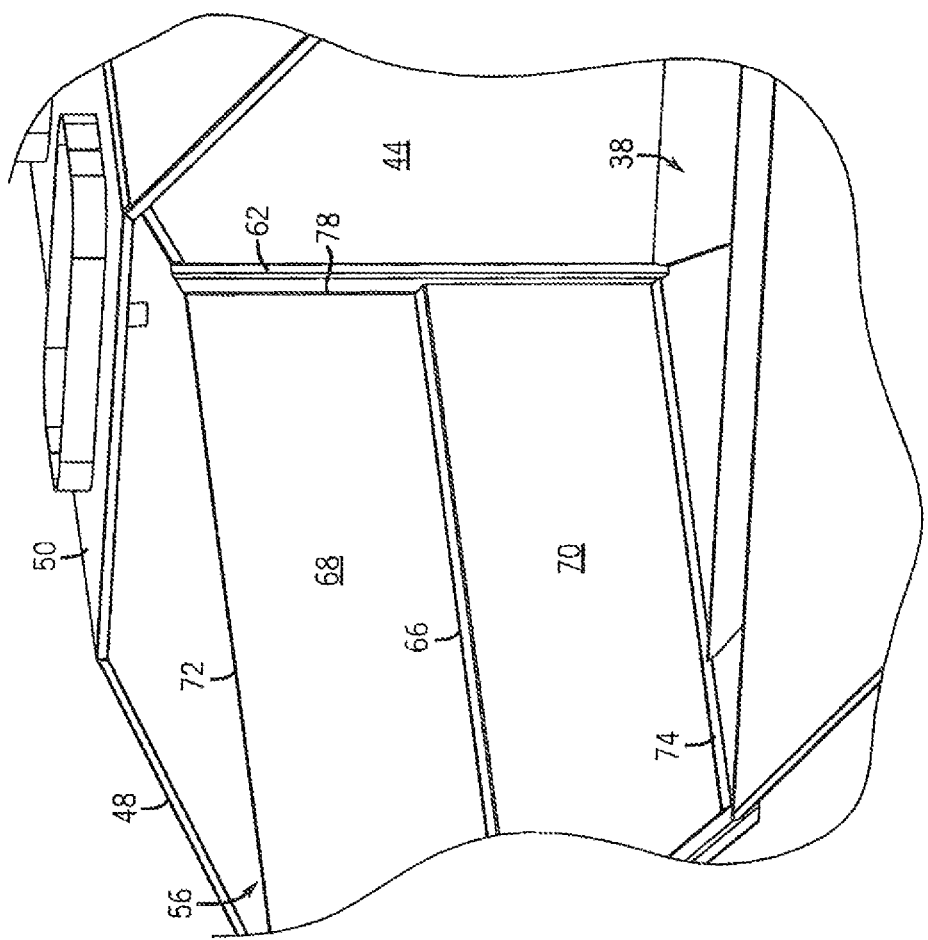
FIG. 6 is an enlarged isometric view of a divider plate and sidewall of the commodity tank connected to a connecting member according to one embodiment of the invention.
Figure 7:
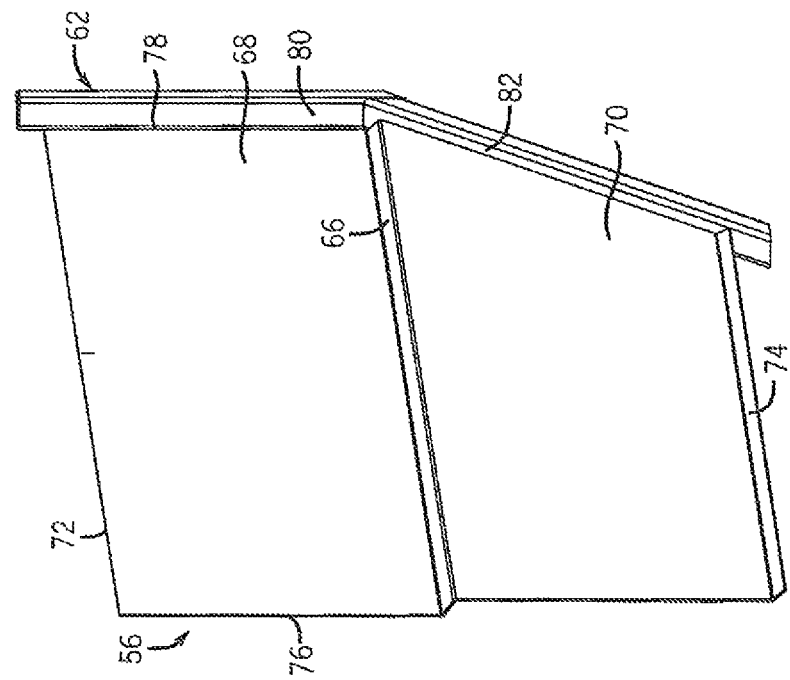
FIG. 7 is an isometric view of a sidewall of the commodity tank connected to a corner member according to one embodiment of the invention.

With particular reference to FIG. 7, the sidewall 56 has first and second side (lateral) edges 76, 78 that are connected, i.e., weld, to respective corner members 60, 62. As best shown in FIG. 5, corner members 58, 60 are elongated square tubes that extend along the entire height of the sidewalls 54, 56 and, as such, upright along their entire length. In contrast, corner members 62, 64 have an upright portion 80 and an inclined portion 82. Corner members 62, 64 are also square shaped but have a slightly different orientation than corner members 58, 60 to match the cut of the sidewalls 54, 56.

It will be appreciated that the square-shaped profile of the corner members provides relatively wide, planar surfaces to mate with the sidewalls 54, 56, the upper end panel 44, and end wall 52. Thus, rather than forming corners with a complimentary bent portion to match the bent portion of the sidewalk, the present invention provides a commodity tank having square tubular corner members that present a flat surface to which the bent portions can be connected in a conventional manner, such as welding.

Figure 8:
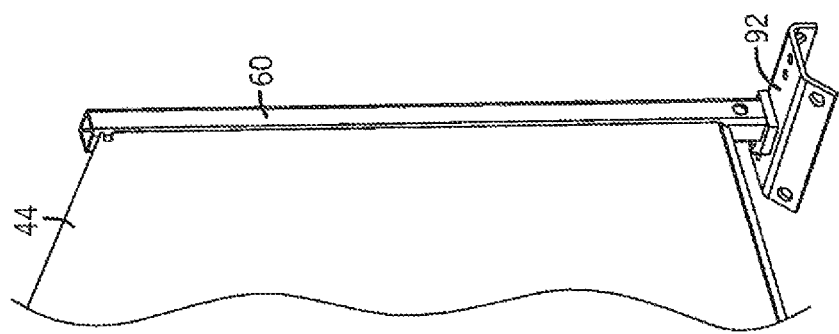
FIG. 8 is a rear isometric view of a end plate of the commodity tank connected to the corner member according to one embodiment of the invention.

Additionally, and as best shown in FIGS. 1, 5 and 8, the configuration of the corner members 58, 60, 62, and 64 provide planar lower surfaces that mate with frame brackets 84, 86, 88, 90, 92, 94 for coupling the commodity tank to the frame 16. In a preferred embodiment, frame brackets 86, 92 are sized to mate with two corner members, i.e., the adjacent corner members of tanks 12, 14 as shown in FIG. 1.

Figure 10:
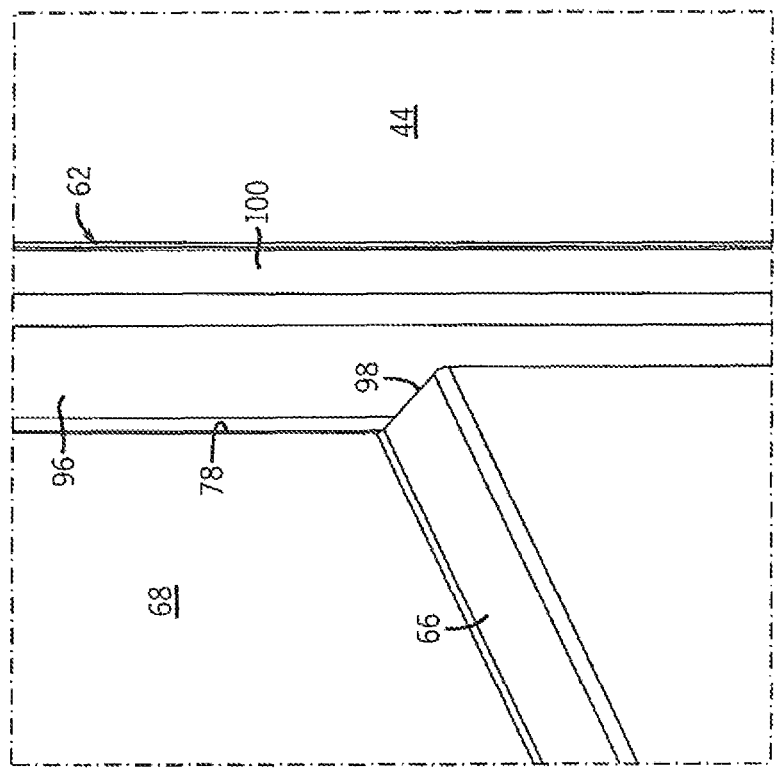
FIG. 10 is an enlarged view of the sidewall of FIG. 9 shown connected to a corner member of the commodity tank according to an embodiment of the invention.
Figure 9:
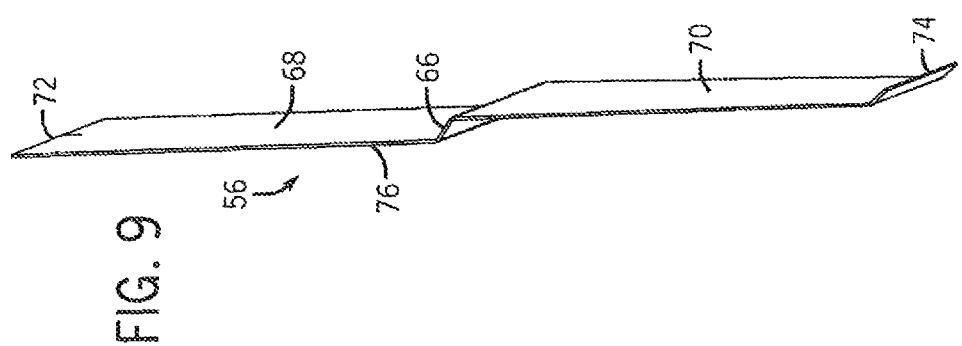
FIG. 9 is an end view of a sidewall of the commodity tank.

FIG. 10 shows the mating of sidewall 56 with corner member 62 according to the present invention. It can be seen in the figure that the planar face 96 provides a wide seat for the lateral edge 98 of the bent portion 66. The increased surface area of the planar face 96 enables the sidewall 56 to be weld to the corner member 62. Similarly, the side face 100, which is oriented ninety degrees from planar face 96, provides a wide surface area for welding, or otherwise connecting, the upper end panel 44 to the corner member 62. It will be appreciated that the other faces (not numbered) of the corner member 62 provide a similar benefit.

Figure 11:
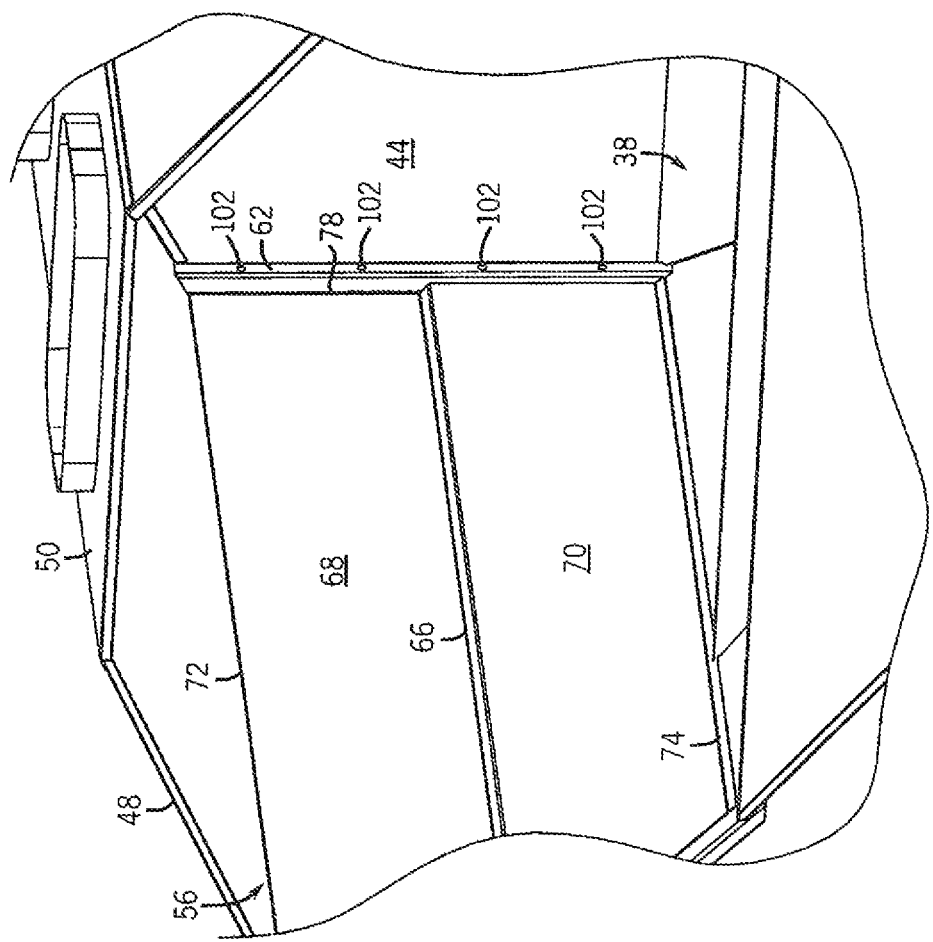
FIG. 11 shows a corner member according to another embodiment of the invention.

From the foregoing it will be appreciated that the present invention provides a commodity tank design having corner members with relatively large, flat surfaces for the bent sheet metal (sidewalk) to mate to while also providing relatively large, flat surfaces at perpendicular angles for the other walls or panels of the tank with which to mate. Additionally, by using the square tubes as corner members for the commodity tank, the square tubes can attached to mounting brackets for securing the tank to the frame. Further, it is contemplated that square tubes, which are preferably hollow, can be flow-coupled to the air system of the air seeder and used for ducting air from the air system into the tanks. Thus, for example, it is contemplated that vent holes 102, as shown in FIG. 11, may be formed in one or more of the interior surfaces of the corner members so that air may be ducted into the tank. In the illustrated example, each corner member has four (4) vent holes spaced at equal intervals along the length of the corner member. However, it is understood that more than four or less than four vent holes could be used. Similarly, it is contemplated that the position of the vent holes could be different from that shown. For example, the vent hole(s) could be placed near the upper end of the corner members.

It is further contemplated that the air flow through each vent hole could be the same or different. For example, it is contemplated that the size of the orifices forming the vent holes could vary within a single corner member to differentiate the velocity of air flow. It is also contemplated that conduits (not shown) could be run through the corner members and flow-couple with respective vents to provide dedicate air streams with potentially differing velocities to the several vent holes.

It is also contemplated that the orifices forming the vent holes could be formed to provide directional airflow. For example, the orifices could be shaped such that the air flow exits the orifices in along an upward or downward trajectory. It is further contemplated that the vent holes may be have corresponding covers that are mechanically linked, for example, to a control device that allows a user to open, partially close, or close a selected vent holes. Preferably, such control devices are accessible from outside the commodity tank and allow the vent holes to be open or closed even with a commodity is contained within the tank.

It is further contemplated that the airflow through one or more the vent holes could be sensed and used to provide manual or automated control of any fans, blowers, pumps, motors, and the like that drive air to the corner members through the vent holes. It is further contemplated that the vent holes may include screens to prevent the passage of commodity therethrough.

Alternatively, one or more of the corner tubes may have an open bottom flow-coupled to the air source and a (at least partially) open top that is open to the interior volume of commodity tank.

The present invention has been described in terms of the preferred embodiment, and it is recognized that equivalents, alternatives, and modifications, aside from those expressly stated, are possible and within the scope of the appending claims.

The invention claimed is:

1. A method of manufacturing a tank for use with an air seeder, wherein the tank includes a plurality of generally planar panels forming sides of the tank, the method comprising:
    attaching adjacent planar panels to an elongated corner piece being generally tubular and having a generally square-shaped cross-section and at least one vent hole, wherein the panels and the elongated corner piece collectively define a volume of an enclosure for holding a granular commodity; and
    interconnecting the corner piece to an air source such that the corner piece is in flow communication with an air source;
    ducting air from the air source to at least one vent hole through the corner piece so as to allow the ducting of the air through the at least one vent hole into the volume.

2. The method of claim 1 further comprising forming a warping-reducing bend in each of the panels.

* * * * *